Nov. 8, 1966 W. E. SCHORTMANN 3,284,307
FLUID CONTROL SYSTEM FOR BOILING NUCLEAR REACTOR
Filed Oct. 30, 1963 3 Sheets-Sheet 1
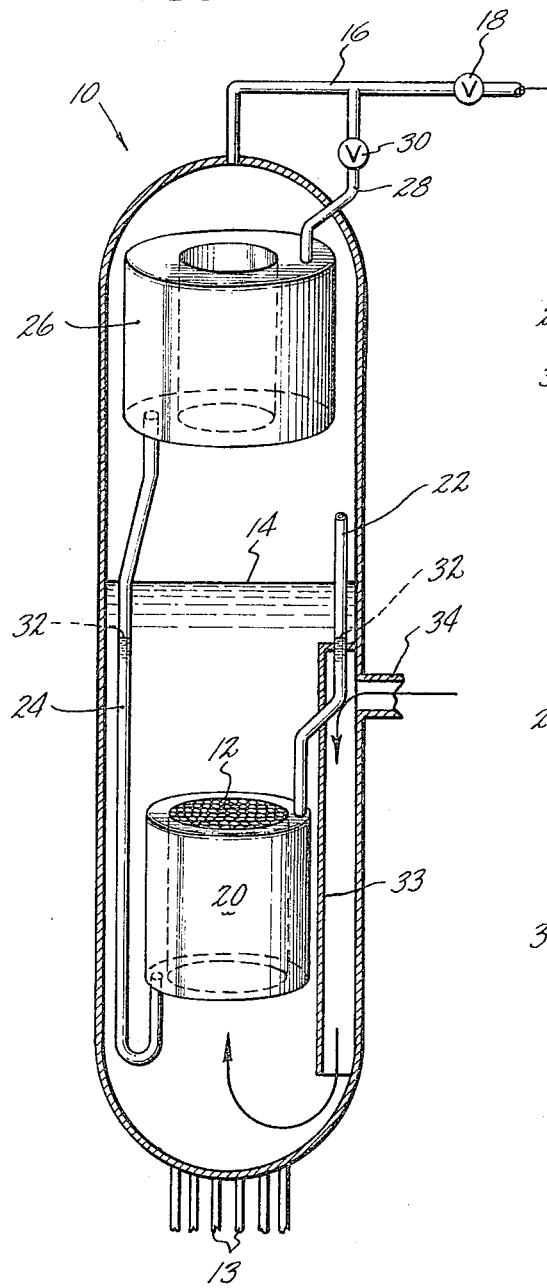
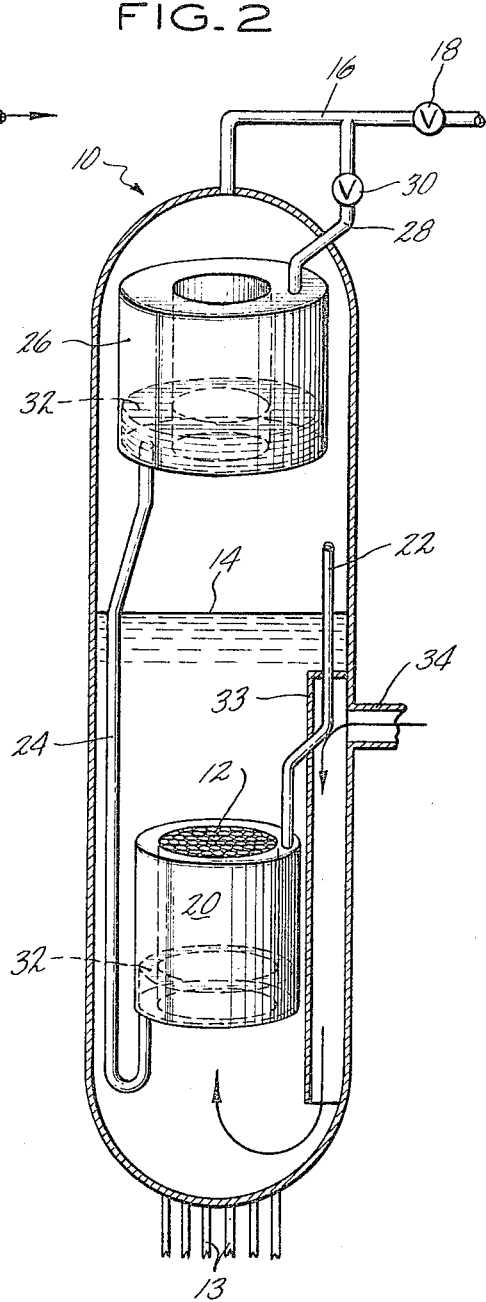

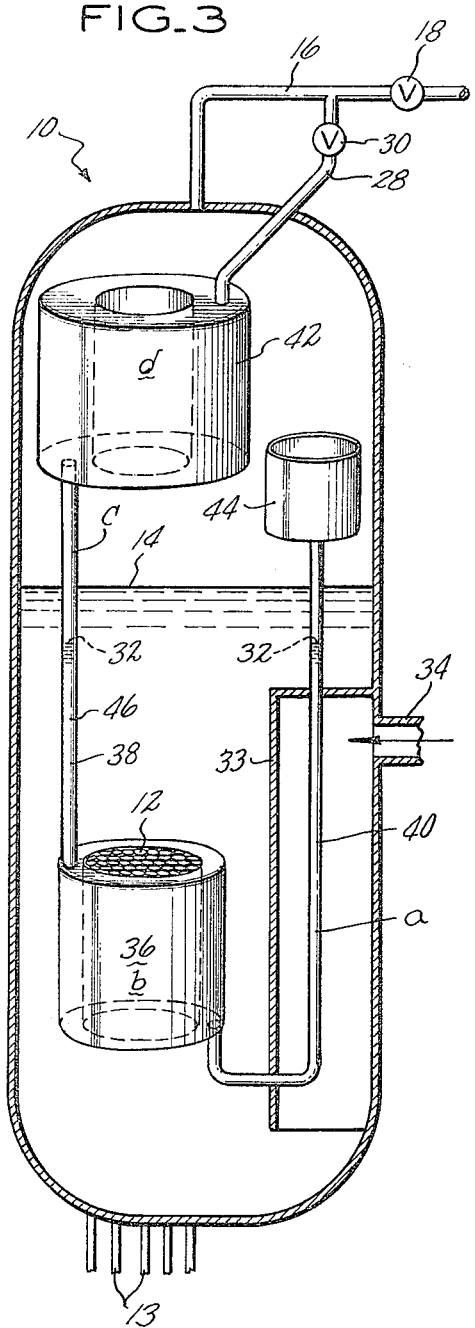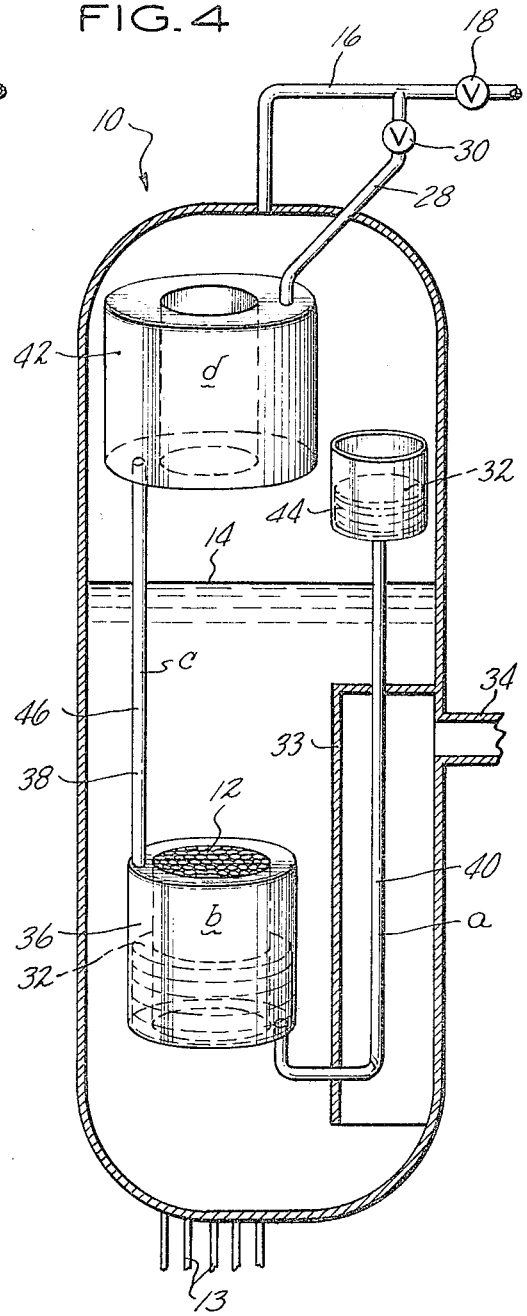

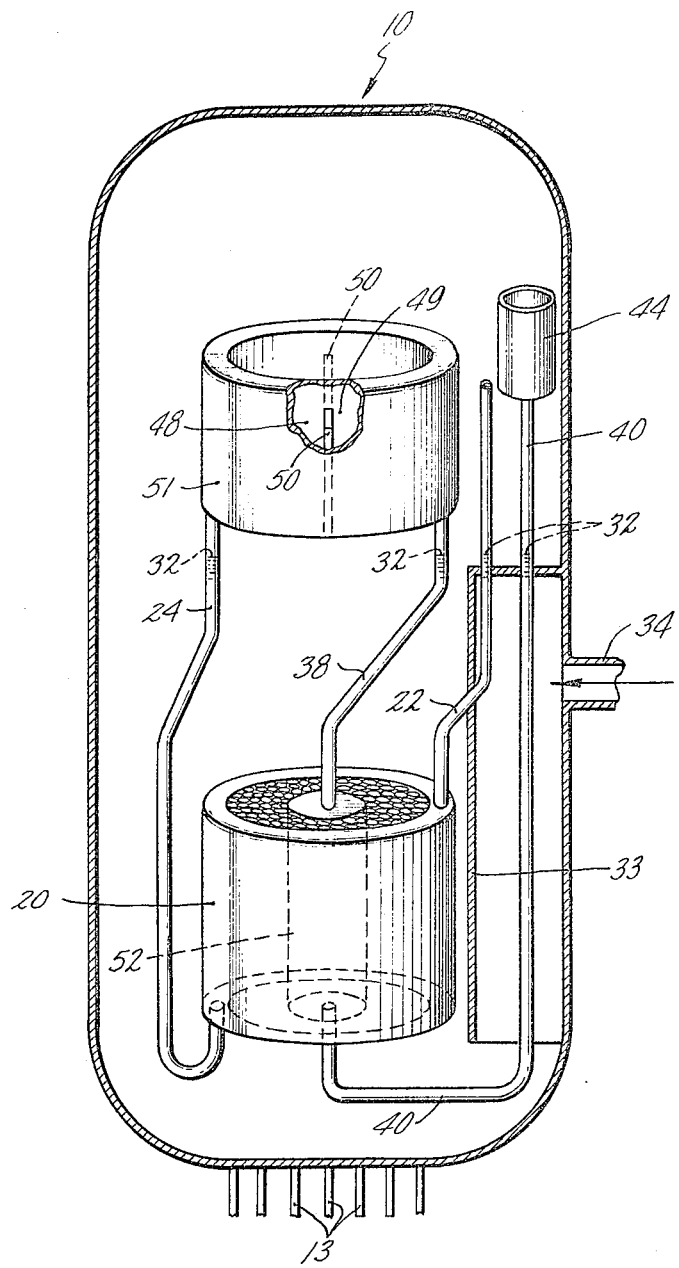

United States Patent Office 3,284,307
Patented Nov. 8, 1966

3,284,307
FLUID CONTROL SYSTEM FOR BOILING
NUCLEAR REACTOR
Walter E. Schortmann, West Hartford, Conn., assignor to
Combustion Engineering, Inc., Windsor, Conn., a corporation of Delaware
Filed Oct. 30, 1963, Ser. No. 320,203
11 Claims. (Cl. 176—20)

This invention relates generally to boiling nuclear reactors employing a moderator-coolant as the vaporizable medium and is particularly concerned with such reactors which have a tendency to vary their heat output with variation of pressure within the reactor.

This tendency to vary the heat generated in a boiling nuclear reactor employing a moderator-coolant as a vaporizable medium is occasioned by the effect that a change in pressure has upon the density of the vaporizable medium within the core of the reactor. For instance, in such a reactor wherein the coolant moderator is boiling, the bubbles (or voids) will tend to collapse upon an increase in pressure within the reactor as may be occasioned by a sudden decrease in demand of the vapor that is produced in and egresses from the reactor. This decreasing demand may cause a throttle valve to be closed or moved toward a closed position which, in turn, will cause an increase in pressure in the reactor. As a result of the collapse of the voids in the boiling coolant-moderator, there is an increase in the gross moderator density in the nuclear reactor core region which, in turn, increases the reactivity in the core thereby increasing the heat output and causing a power surge, which makes the system pressure rise even higher. Thus when it is desired to reduce the power output, the reactor responds in the wrong direction by increasing the power output. An opposite chain of events occurs incident to a decrease in pressure in the reactor as may be occasioned by a sudden opening of the throttle valve.

It is current practice to counteract this tendency of the reactor to provide this inherently incorrect control action incident to pressure variation by fast movements of control rods, which compensate for the increase in reactivity through their poisoning effect, or by fast movements of flow control valves, which alter the recirculation coolant flow rate to establish the proper void concentration for criticality through a change in the total heat removal capability of the returning coolant. Furthermore, a wasteful vapor dump, whereby vapor is vented to atmosphere or conveyed directly to a condenser, is often associated with these corrective methods. The correction of this inherent characteristic of boiling reactors in this manner leaves much to be desired in that rapid movements of mechanical devices are objectionable because they are difficult to achieve and control especially with the accuracy and reliability required for this particular application. Futhermore, fast acting control rods and/or valves and the associated necessary instrumentation are extremely costly.

In accordance with the present invention this inherent characteristic of boiling reactors employing moderator-coolants as the vaporizable medium is corrected or compensated for by means of a pressure actuated fluid control system which responds to the pressure in the reactor system and is effective incident to a variation in this pressure to provide a corrective action so that such variation in pressure is of limited value. In accordance with one embodiment of the invention the fluid control system employs a moderating fluid with this moderating fluid being moved from a reactivity sensitive region of the nuclear reactor through the use of the driving force provided by the pressure rise that is unwanted. Removal of this moderator decreases the reactivity of the core and effects a momentary shut down of the heat source, thereby preventing a pressure surge. Thus, when vapor demand decreases and system pressure starts to rise, the pressure increase directly and instantaneously causes an action that prevents the continuation of the increase in pressure. As soon as the vapor bubbles can collapse under the increased pressure and add moderator to the core region, the removal of an equivalent amount of moderator takes place in a natural manner leading to control of the reactor and the prevention of high pressure surges. This result is accomplished with no moving parts and solely in response to pressure variation in the reactor.

While high pressure increases or surges are of greater concern than substantial decreases in pressure or pressure surges in a negative sense, it is also desirable to eliminate the latter in order to provide for a stable operation. In another embodiment of the invention there is provided a fluid control system which also responds to the pressure in the reactor and which contains a poison in solution with this embodiment moving poison from a reactivity sensitive region of the reactor incident to a decrease in pressure in the reactor. This removal of poison from a reactivity sensitive region of the reactor increases the reactivity thereby increasing the heat output and preventing the continued lowering of the reactor pressure.

A still further modification of the invention utilizes both of the aforementioned fluid control systems which respond to the pressure within the reactor and thereby decreasing the pressure variation that accompanies variation in demand with relation to the load supplied by the boiling reactor whether this variation be an increase or a decrease in demand.

It is accordingly an object of this invention to provide an improved boiling nuclear reactor utilizing a moderator-coolant as the vaporizable medium.

A further object of the invention is to provide such an improved boiling reactor where pressure variations incident to variation in demand supplied by the reactor are maintained at a relatively low value.

A still further object of the invention is to provide such an improved boiling reactor utilizing a pressure operated control system effective to obtain a naturally correct initial response with regard to the output of the reactor incident to a sudden change in reactor pressure.

A still further object of the invention is to provide such an improved reactor having such a fluid pressure operated control system wherein actuation of the control system is obtained solely through variation of pressure in the reactor.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawings wherein:

FIGURE 1 is a diagrammatic illustration in the nature of an isometric view of the reactor with the pressure vessel thereof broken away and showing the various components of the system of the present invention with details of the reactor not necessary to an understanding of the invention being eliminated or shown only diagrammatically;

FIGURE 2 is a view similar to that of FIGURE 1 but showing displacement of the fluid in the pressure operated fluid control system occasioned by a sudden increase in pressure in the reactor;

FIGURE 3 is a similar view of a modified embodiment of the invention employing a control system operative incident to a decrease in pressure in the reactor to limit the extent of the pressure decrease and counteract the effect thereof on reactivity;

FIGURE 4 is a view similar to that of FIGURE 3 but showing the displacement of the fluid in the fluid control system incident to a decrease in pressure; and FIGURE 5 is an illustration of another modified embodiment, in effect, both the control system of FIGURE 1 which responds to a pressure increase in the reactor and the control system of FIGURE 3 which responds to a pressure decrease in the reactor and compensates for the effect of such pressure variations.

Referring now to the drawings and particularly to FIGURE 1 and FIGURE 2, there is disclosed therein a boiling nuclear reactor employing a moderator-coolant as the vaporizable medium, such as light or heavy water. For an explanation of the theory and operation of such boiling nuclear reactors and for a detailed description of the components of such reactors reference is had to U.S. Patent No. 2,936,273 issued May 10, 1960 to S. Untermyer. The boiling reactor of the present invention includes the pressure vessel or container 10 within which is mounted the core 12, which, as is conventional, contains fuel elements fixedly retained therein in spaced relation and over which flows the vaporizable cooling medium and which may be of the construction shown and described in the aforementioned U.S. Patent 2,936,273 or may be tubular elements such as one half inch stainless steel tubes filled with UO₂ powder in compacted form. The power output of the reactor, in accordance with conventional practice, may be controlled by control rods adjustably movable within the reactor core. Since these form no part of the present invention, they have not been illustrated except to show the extensions 13 thereof projecting from the bottom of vessel 10.

The illustrative reactor embodiment shown in the drawings is of the natural circulation type wherein the fluid, i.e. the coolant-moderator, is circulated through the core of the reactor due to the difference in density between the upflow and the downflow leg of the circulating system. The coolant-moderator flows up through the core of the reactor and flows down around the outside of the core intermediate the vessel wall and the core. Boiling takes place within the core of the reactor and a separation of the vapor from the liquid occurs at the liquid level 14 within the vessel 10. The vapor passes up through the upper region of the vessel and is conveyed therefrom through the conduit 16 to a turbine, intermediate heat exchanger or other point of use for the vapor. There is illustratively shown in the conduit 16 a throttle valve 18 which is adjustable so as to vary the vapor output of the reactor in accordance with the desired variable demand or load.

This reactor system has the characteristic, assuming no corrective action is taken, that a pressure surge will occur incident to a sudden partial or complete closing of the valve 18. A sudden decrease in demand for the vapor output of the reactor results in an increase in pressure in the reactor which, in turn, collapses voids in the coolant-moderator in the reactor increasing the moderator density therein which, in turn, increases the heat output further raising the pressure. To counteract this effect there is provided in the embodiment of FIGURES 1 and 2 a pressure operated fluid control system within the reactor and which includes the enclosure 20 positioned adjacent the reactor core such that it is in a reactivity sensitive region with relation to the core. While this enclosure has been illustratively disclosed as disposed about the core and being of annular configuration it may be comprised of several segments and positioned within the core. Extending from the enclosure 20 to the upper region of the reactor vessel are the conduits or legs 22 and 24 with the leg 24 being connected at its upper end to the closed housing or container 26 while the leg 22 is open to the upper region of the vessel. This system thus, in effect, forms a manometer and contained within the system is a moderating fluid, which may be the coolant-moderator employed within the boiling reactor, such as light or heavy water. Accordingly, the fluid in the control system is subjected to the pressure in the reactor and, during operation of the reactor, the enclosure 20 is surrounded by water at saturation temperature so that boiling does not take place within the control system itself.

In order that the height of the moderating fluid in the leg 24 and the leg 22 will be generally equal when the reactor is at its steady state operation and at its desired pressure, there is provided a pressure equalization conduit 28 that extends between the container 26 and the conduit 16 and which has connected thereinto valve 30. By opening valve 30 when the reactor is at its steady state operation as aforementioned, the liquid level in the legs 22 and 24 will occupy the same level such as 32 as depicted in the drawing. The valve 30 will then be closed and remain closed during operation of the reactor.

The pressure responsive fluid control system operates on the basic principle of manometry. An increase in pressure in the reactor pushes the moderator down in leg 22 and up leg 24 into the closed container 26 with some or all of the moderator being removed from the enclosure 20 depending on the extent of the pressure increase. The pressure in container 26 tends to increase as the liquid enters. However, the volume of this container is much greater than the volume of moderator that must be moved to effect a sufficient reactivity loss to virtually kill the power source. Consequently, the system pressure surge is minimized to this latter pressure increase, and it can be held to a relatively small value depending only on the ratio of the two volumes mentioned and the speed with which the moderator can move under the differential driving force. With the heat source essentially off, the system pressure will fall and the moderator will flow back to its original position under the influence of the pressure differential, now in the opposite direction. The cycle may repeat several times until a slow control rod or valve movement to alter the recirculation of the cooling medium can permanently adjust the power output to the new power demand or, if a modest system pressure increase is allowed in a particular reactor, until the moderator density change accompanying the allowed system temperature rise adjusts reactivity.

No attention is needed to maintain the quantity or level of moderator within the "manometer" fluid control system. This is so because the leg 22 of the control system has a portion thereof that extends within the baffle enclosure 33 which directs subcooled feedwater entering the reactor vessel through inlet 34 downwardly to the lower region of the core. This subcooled feedwater surrounding this portion of leg 22 acts as a condenser so that vaporized coolant will condense within this leg 22. Thus should coolant be forced from the upper end of the leg 22 incident to a reduction of pressure in the reactor, this coolant will be replaced when the desired pressure is restored by condensation within the leg 22.

It should be noted that, incident to an increase in vapor demand resulting in a decrease in system and reactor pressure, moderator-coolant will spill out of the open end of leg 22 until the pressure in the closed container 26 decreases to the new system pressure. However, the enclosure 20 will not be emptied of coolant-moderator since vapor from leg 24 will pass up through the liquid in the enclosure 20 to equalize the pressure between the vapor space of the reactor and the container 26.

FIGURE 1 illustrates the disposition of the moderator fluid in the fluid control system in a steady state operation at the desired pressure. FIGURE 2 indicates the displacement of the moderator incident to a relatively sudden increase in pressure in the primary system of the power system of which the reactor forms a part and with the moderator being forced well down in the enclosure 20 such as to effectively shut down the heat source. The liquid levels in the legs of the "manometer" control system are identified as 32.

Accordingly, with this embodiment of the invention a rapid and high pressure increase in the reactor incident to a decrease in demand is prevented with the control system providing a naturally correct initial response to decrease the heat output of the reactor incident to a pressure increase.

With this arrangement the following advantages are realized:

The invention will change the initial response of boiling nuclear reactors to a decrease in power demand from an inherently incorrect to an inherently correct one. It therefore eliminates the need and cost for fast movements of mechanical devices, such as control rods or valves, and the associated instrumentation. The invention itself will be inexpensive since it need withstand only a small pressure difference, since it has no moving parts, and since it has no instrumentation.

The invention will save on the cost for the reactor vessel by permitting a lower design pressure for a given operating pressure, since pressure surges are reduced. It will not cause a large increase in reactor vessel size, if indeed any increase at all. In general, one core volume is needed for the enclosed vapor space to keep the pressure surge to less than 10% of operating pressure, and there are usually about two core volumes above the liquid level. The requirement is based on an average void volume of 15%, a core moderator-to-solids ratio of one-half, and a pressure increase 30% greater than calculated by the ideal gas law.

Wasteful steam dumps to relieve pressure surges are eliminated.

Since the invention requires no attention, the costs of maintenance and operating supervision that are incurred by other methods will be saved.

No loss in safety or reliability will result from the use of this invention. If a significant leak occurs, safety relief valves will protect against an overpressure situation, as they do if other methods fail. Reliability is high since the only thing that can go wrong with the stationary system is a leak. Corrosion deposits will not plug the system because the pipes are not very small. In fact its simplicity enhances reliability.

The embodiment of the invention disclosed in FIGURES 3 and 4 is effective to respond to a sudden decrease in pressure in the reactor as occasioned by a sudden increase in the load demanded of the reactor by the turbine. In this embodiment of the invention the fluid control system contains a poison and in response to a decrease in pressure in the reactor, poison is removed from a reactivity sensitive region of the reactor core to compensate for the reactivity loss suffered as more voids are produced due to the pressure decrease thereby producing a decrease in density of the moderator-coolant in the core. In this embodiment of the invention the control system includes the enclosure 36 to which is connected the leg 38 and leg 40. As in the previously described embodiment, the control system is generally in the form of a manometer and leg 38 communicates at its upper end with the closed container 42 while leg 40 is connected with reservoir 44 that is open at its upper end to the upper region of the vessel 10. As in the previously described embodiment, the enclosure 36 may be in the form disclosed where it is disposed about the core 12 of the reactor so that the fluid in the enclosure is in a reactivity sensitive region with respect to the reactor core or this enclosure may take the form of one or more segments disposed within the core of the reactor. The fluid contained within the fluid control system, i.e., the fluid 46 has in solution a poison material such that the effective action of this fluid is that of a poison. For instance, the fluid may be the moderator-coolant employed with the boiling reactor and which is passed up through the reactor core with this fluid in the control system containing a solution of boric acid or some similar soluable poison. The reservoir 44 is provided in this embodiment of the invention in order that this reservoir together with leg 40 can hold generally the entire quantity of liquid in the fluid control system so that the main system will never be contaminated with the neutron absorber.

In operation of the embodiment disclosed in FIGURES 3 and 4 the fluid level in the legs 40 and 38 of the manometer type control system are equalized at steady state operation and at the desired operating pressure of the reactor by means of opening valve 30 in conduit 28 for a short period with this conduit establishing communication between the container 42 and the vapor line 16. After thus equalizing the pressure so that the liquid level in legs 38 and 40 is the same, the valve 30 is closed and remains closed during operation of the reactor. Thereafter, should a sudden increase in demand occur causing a sudden opening of valve 18 to meet this demand and a consequent sudden pressure drop within the reactor, the poison containing fluid in the control system will move from the position disclosed in FIGURE 3 to the position disclosed in FIGURE 4 where poison is moved from a reactivity sensitive region of the core with the pressure in the container 42 causing this displacement of the control fluid in the container system. This removal of poison will compensate for the reactivity loss caused by the expansion of the vapor voids in the reactor core occasioned by the reduction in pressure in the reactor.

A portion of the leg 40 is disposed within the baffle 33 so that the subcooled feedwater entering the reactor through the inlet 34 will contact this leg of the control system and cause condensation of vapor therewithin should there be a loss of liquid from the control system due to vaporization from the surface of fluid in the reservoir 44 when the fluid is moved to the position disclosed in FIGURE 4.

Mixing of the poison containing fluid in the control system with the moderator-coolant flowing through the reactor and the portion of the system that conveys effluent from the reactor is prevented by having the container 44 of a sufficient size as to contain all of the fluid from the leg 46 and the enclosure 36. Thus if the pressure is suddenly reduced in the reactor to a degree as to force the fluid completely from the enclosure 36 into the leg 40 and the container 44 such that vapor bubbles up through the leg 40 and the fluid in container 44, there will be no overflow of the poison containing fluid from the control system into the reactor. Vaporization of fluid from the container 44 does not cause a carryover of poison to the reactor system since only the liquid within which the poison is contained in solution will be vaporized with the poison remaining in the liquid in the control system and merely becoming more concentrated.

The embodiment disclosed in FIGURES 1 and 2 and the embodiment disclosed in FIGURES 3 and 4 may be used in conjunction to decrease the pressure variations occasioned by a sudden decrease or a sudden increase in demand in relation to the load supplied by the reactor. FIGURE 5 discloses an arrangement wherein these two control systems are employed in a reactor. In this arrangement the control system responding to an increase in pressure as occasioned by a sudden decrease in demand is generally similar to that of FIGURES 1 and 2 with this system including the enclosure 20 disposed about the core 12 of the reactor and to which enclosure is connected to the legs 22 and 24 with leg 24 communicating at its upper end with the closed container 48. This container 48 is divided into two sections by means of baffles 50 with these two sections being in communication with each other over the top of the baffles. A moderating fluid is contained within this control system and the action of this moderating fluid is the same as that described with relation to the FIGURES 1 and 2 embodiment. The poison containing fluid control system of this FIGURE 5 embodiment is generally similar to that of the FIGURES 3 and 4 embodiment with the exception that in this FIGURE 5 arrangement the portion of the poison control system disposed in the reactivity sensitive region of the reactor is positioned centrally of the core 12 and is identified as enclosure 52 in lieu of the construction shown in FIGURES 3 and 4. This poison fluid control system includes the legs 40 and 38 connected with the enclosure 52 with the leg 40 communicating at its upper end with the reservoir 44 and with leg 38 being connected with the section 49 of the container 48. The baffles 50 prevent the intermixing of the poison fluid in the poison fluid container system and the moderator in the moderator fluid control system. The legs 22 and 40 are contacted by subcooled feedwater in the same manner as in the embodiments of FIGURES 1 to 4, and the action of the two fluid control systems is the same as that described with relation to these previously described embodiments with an increase in pressure in the reactor causing moderator to be forced from the reactivity sensitive region of the core while a decrease in pressure as occasioned by an increase in load causes poison to be forced from the reactivity sensitive region of the core.

As in the FIGURES 1 through 4 embodiments, the manometer type fluid control systems of FIGURE 5 will have the fluid in the two legs of each of the manometers disposed at generally the same level when the reactor is at its steady state operation and at its desired pressure and with this being achieved through the connecting of the container 48 to the vapor line 16 through conduit 28 and valve 30. After thus leveling the fluid in each of the control systems the valve 30 is closed and remains so during operation of the reactor.

It will be appreciated that each of the embodiments will have suitable control means for varying the output of the reactor in order to meet the load imposed thereon and as previously mentioned, the conventional control rods, not shown, may be employed for this purpose. The output vapor line 16 may be connected directly to a load such as the turbine and may be connected to a heat exchanger in the event that an indirect system is utilized.

It will be appreciated that with the present invention pressure variations in the reactor will be maintained at a relatively low value with high pressure surges due to sudden changes in load being prevented as a result of the action of the control system counteracting the tendency of the boiling reactor to act in a manner to accentuate such pressure changes and that the control system provides a naturally correct initial response to sudden decreases or increases in vapor demand from the reactor.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A boiling reactor comprising a container, a core mounted in said container, means directing a coolant-moderator in heat exchange relation with said core with a portion of the coolant-moderator being vaporized, said reactor having the characteristic that incident to a pressure change in the reactor there is a change in heat output with the heat output increasing with an increase in pressure, a pressure operated, fluid control system effective to compensate, at least in part, for this variation in heat output with variation in pressure, said system including a portion in the vicinity of the core, a closed portion in communication with the first named portion and disposed thereabove and another portion extending upward from the first named portion and open to the interior of the container, said system having disposed therein a fluid having a pronounced effect upon the reactivity in the core.

2. The boiling reactor organization of claim 1 wherein said system contains the same fluid employed as the coolant-moderator of the reactor.

3. The organization of claim 1 wherein the fluid in said system contains a poison.

4. A boiling reactor comprising in combination a container, a core in said container, means for passing a coolant-moderator in heat exchange relation with the core thereby vaporizing a portion of said coolant-moderator, said reactor having the characteristic that incident to a decrease in pressure the heat output of the reactor decreases and incident to an increase in pressure the heat output of the reactor increases, means actuated in response to the pressure in the reactor effective to compensate, at least in part, for this characteristic of the reactor to vary the heat output with variation in pressure, this last named means including a first fluid system generally in the form of a manometer containing a moderating fluid and operative to decrease the amount of moderating fluid in the vicinity of the core incident to an increase in said pressure and a second fluid system generally in the form of a manometer with the fluid therein containing a poison and being operative to remove poison from the vicinity of the core incident to a decrease in said pressure in the reactor.

5. A boiling water reactor comprising in combination a container, a core in said container, means for passing a coolant-moderator in heat exchange relation with the core thereby vaporizing a portion of said coolant-moderator, said reactor having the characteristic that incident to an increase in pressure the heat output of the reactor increases, means actuated in response to the pressure in the reactor effective to compensate, at least in part, for this characteristic of the reactor to vary the heat output with variation in pressure, this last named means including a fluid pressure system generally in the form of a manometer containing a moderating fluid and operative to decrease the amount of moderating fluid in the vicinity of the core incident to an increase in said pressure.

6. A boiling water reactor comprising in combination a container, a core in said container, means for passing a coolant-moderator in heat exchange relation with the core thereby vaporizing a portion of said coolant-moderator, said reactor having the characteristic that incident to a decrease in pressure the heat output of the reactor decreases, means actuated in response to the pressure in the reactor effective to compensate, at least in part, for this characteristic of the reactor to vary the heat output with variation in pressure, this last named means including a fluid system generally in the form of a manometer and containing a fluid that contains a poison and operative to remove poison from the vicinity of the core incident to a decrease in the pressure in the reactor.

7. A boiling reactor comprising in combination a container, a core in said container, means for passing a coolant-moderator in heat exchange relation with the core thereby vaporizing a portion of said coolant-moderator means for supplying subcooled feedwater to the reactor, said reactor having the characteristic that incident to a change in pressure the heat output of the reactor changes, control means operative to compensate, at least in part, for such change in heat output with said control means including a fluid system generally in the form of a manometer and having one leg open so that the fluid in the manometer is subjected to pressure in the reactor with the other leg being closed, said manometer containing a fluid which has a pronounced effect on the reactivity in the reactor core with a portion of this control system being in the vicinity of the core, at least a portion of said one leg being contacted by subcooled feedwater entering the reactor so as to condense fluid in said one leg.

8. The boiling reactor organization of claim 7 wherein the fluid in the control system is a moderating fluid and wherein said closed leg has a volume many times greater than the volume of fluid forced up thereinto incident to a sudden pressure increase in the reactor.

9. The boiling reactor organization of claim 8 wherein the fluid in the control system contains a poison and wherein said one leg has a fluid containing capacity sufficient to hold the fluid forced thereup incident to a sudden decrease in pressure in the reactor.

10. A boiling reactor including a core disposed in a container with a coolant-moderator fluid passed in heat exchange relation with the core with a portion of this coolant-moderator being vaporized, the reactor having the characteristic that incident to an increase in pressure the heat output of the reactor tends to increase, the improvement comprising control means responsive to the pressure in the reactor and operative to compensate at least in part for the tendency of the heat output to increase with increase in pressure, this control means including an enclosure adjacent the reactor core, first conduit means communicating with said enclosure and extending upwardly to the upper region of the reactor container and being open at its upper end to the container and second conduit means communicating with said enclosure and extending upward to the upper region of the container and being closed to the container interior, said enclosure and said first and second conduits containing a moderator fluid with at least a portion of this fluid being forced from said enclosure into said second conduit incident to a sudden increase in pressure in the reactor.

11. A boiling reactor including a core disposed in a container with a coolant-moderator fluid passed in heat exchange relation with the core with a portion of this coolant-moderator being vaporized, the reactor having the characteristic that incident to a decrease in pressure the heat output of the reactor tends to decrease, the improvement comprising control means responsive to the pressure in the reactor and operative to compensate at least in part for the tendency of the heat output to decrease with decrease in pressure, this control means including an enclosure adjacent the reactor core, first conduit means communicating with said enclosure and extending upwardly to the upper region of the reactor container and being open at its upper end to the container with said upper end being enlarged so as to have substantial fluid containing capacity and said second conduit means communicating with said enclosure and extending upwardly to the upper region of the container and being closed to the container interior, said enclosure and said first and second conduit means containing a poison in solution with at least a portion of this solution being forced from the enclosure into the upper enlarged end of said first conduit means incident to a sudden decrease in pressure in the reactor.

References Cited by the Examiner

UNITED STATES PATENTS

| 2,968,600 | 1/1961 | Allen | 176—56 |
| 2,999,059 | 9/1961 | Treshow | 176—42 |
| 3,022,235 | 2/1962 | Brown et al. | 176—55 |

OTHER REFERENCES

Schultz, "Control of Nuclear Reactors and Power Plants," pp. 215, 216, 322, 323, published by McGraw-Hill, 1961.

L. DEWAYNE RUTLEDGE, *Primary Examiner.*

CARL D. QUARFORTH, *Examiner.*

M. R. DINNIN, H. E. BEHREND, *Assistant Examiners.*